United States Patent
Chen et al.

(10) Patent No.: US 6,587,692 B1
(45) Date of Patent: Jul. 1, 2003

(54) LOCATION DETERMINATION USING WEIGHTED RIDGE REGRESSION

(75) Inventors: Byron H. Chen, Whippany, NJ (US); Ren Da, Bernards Township, Somerset County, NJ (US); Ibrahim Tekin, Chatham Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/538,689

(22) Filed: Mar. 30, 2000

(51) Int. Cl.[7] .................................................. H04Q 7/20
(52) U.S. Cl. ...................... 455/456; 455/13.1; 455/427; 342/451; 342/357.06
(58) Field of Search ............................... 455/13.1, 427, 455/435, 456; 342/457, 357.06, 357.08, 357.09, 357.1, 451, 450, 463–464

(56) References Cited

U.S. PATENT DOCUMENTS

| | | | | |
|---|---|---|---|---|
| 4,876,550 A | * | 10/1989 | Kelly | 342/451 |
| 5,625,668 A | * | 4/1997 | Loomis et al. | 455/456 |
| 6,166,685 A | * | 12/2000 | Soliman | 342/357.1 |
| 6,282,427 B1 | * | 8/2001 | Larsson et al. | 455/456 |
| 6,397,071 B1 | * | 5/2002 | Hussain et al. | 455/456 |

* cited by examiner

Primary Examiner—William Trost
Assistant Examiner—Sharad Rampuria

(57) ABSTRACT

Weighted ridge regression (WRR) processing is applied to three or more distance measurements to determine the location of a terminal. For example, in an integrated satellite-based navigation system/wireless network, the location of a mobile unit can be determined by applying WRR processing to at least three distance measurements, where one or more of the distance measurements are satellite-based distance measurements (e.g., GPS pseudorange measurements) and one or more are wireless network-based distance measurements (e.g., round-trip delay or pilot phase offset measurements). WRR processing provides improved accuracy in the determination of mobile unit position over conventional least mean square techniques.

20 Claims, 7 Drawing Sheets

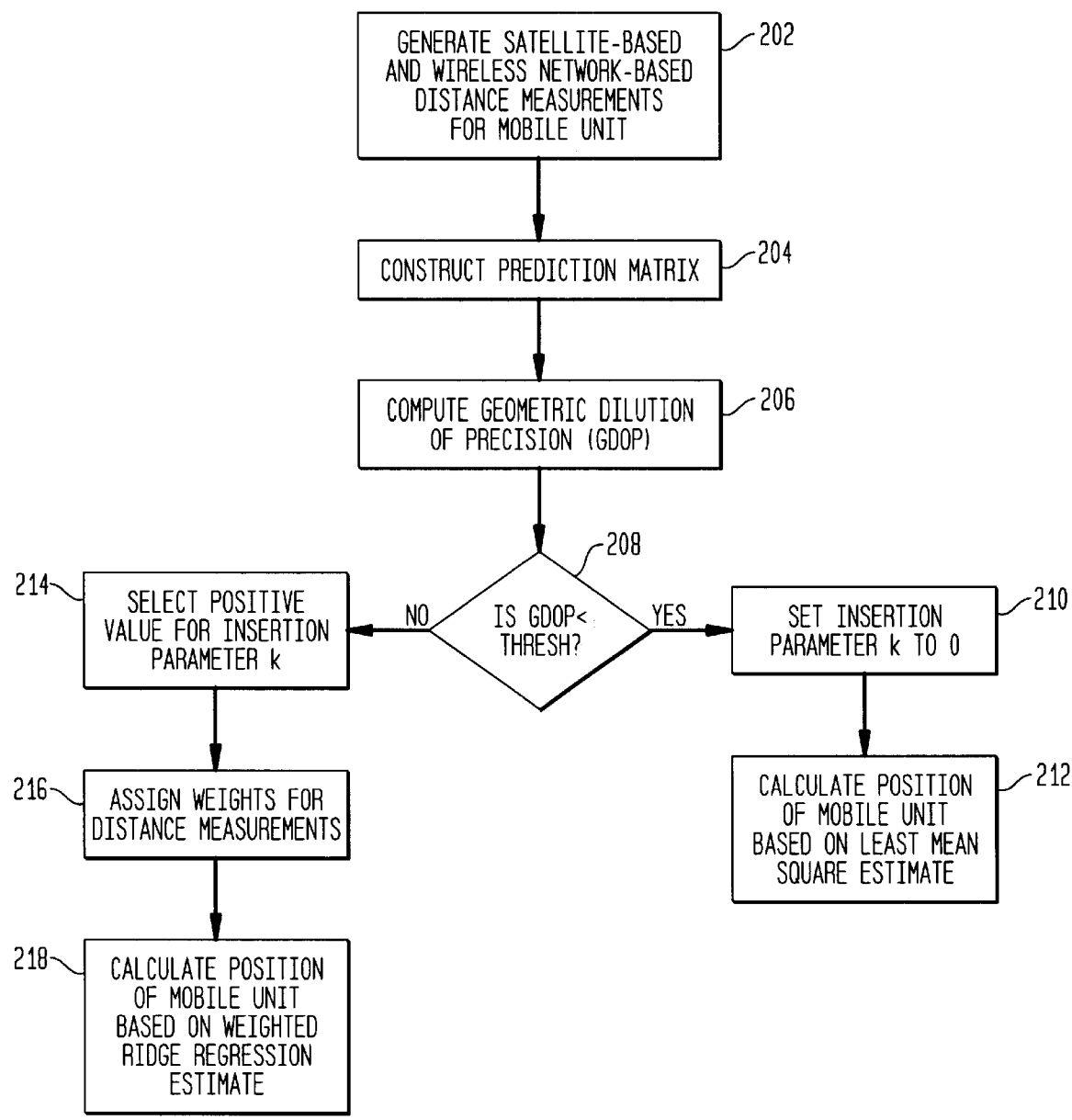

LOCATION DETERMINATION USING WEIGHTED RIDGE REGRESSION

BACKGROUND OF THE INVENTION

1. Field of the Invention

The present invention relates to the location of terminals, such as wireless mobile units, using distance measurements, such as satellite-based and/or wireless network-based distance measurements.

2. Description of the Related Art

Satellite-based navigational systems, such as the Global Positioning System (GPS), provide accurate position information to worldwide users. A satellite-based navigational system requires a terminal to be able to detect signals from at least three satellites in order to determine its location. When GPS signals from three satellites are received, a "two-dimensional" position (e.g., latitude and longitude) of the terminal can be determined. When GPS signals are received from four or more satellites, a "three-dimensional" position (e.g., latitude, longitude, and altitude) can be determined. These preconditions, however, may not always be satisfied, especially when one or more of the direct satellite signals are obstructed, such as for a terminal located inside a building.

When the terminal is a mobile unit or other wireless communication device that is part of a wireless telecommunication network, its position may also be determined based on distance measurements available within the wireless network, such as the round-trip delay (RTD) and the pilot phase offset (PPO). The RTD is the time that it takes to transmit a signal from a cellular base station to the mobile unit and then back to the base station. The PPO is a measure of the code phase of a pilot signal as received by the mobile unit. If RTD and/or PPO measurements corresponding to three or more base stations are available, then the position of the mobile unit may be determined using wireless network-based position techniques including conventional triangulation schemes, such as time difference of arrival or angle of arrival.

One drawback for such wireless network-based positioning techniques is that the accuracy of the position determination is typically much lower than that provided by satellite-based positioning techniques. Another problem is that there may not always be three or more wireless network-based distance measurements available for the purpose of position calculation.

SUMMARY OF THE INVENTION

The present invention is directed to a technique that enables the determination of the position of a mobile unit in a wireless telecommunication network, where the mobile unit is configured with a global positioning system (GPS) receiver or other satellite-based navigational system receiver. According to implementations of the present invention, the position of the mobile unit is determined by integrating satellite-based measurements and wireless network-based measurements. As such, the present invention can be used to determine the position of the mobile unit when less than the required minimum number of satellite signals are available for conventional satellite-based positioning techniques. Moreover, the present invention can be used to provide more accurate positioning than would otherwise be provided by conventional wireless network-based positioning techniques.

Conventional schemes for integrating satellite-based distance measurements and wireless network-based distance measurements for determining the position of a mobile unit do not produce desirable results for several reasons. One problem is that the quality of the measurements, which come from different sources, are quite different. For example, errors in the round-trip delay (RTD) and/or pilot phase offset (PPO) measurements used in wireless network-based positioning techniques may be as much as ten times larger than the errors in the GPS pseudorange measurements used in satellite-based positioning techniques. GPS pseudorange measurement errors are typically about 10–25 meters, while typical RTD measurement errors are about 40–100 meters. Simply combining satellite-based distance measurements and wireless network-based distance measurements (e.g., in a conventional least mean squares (LMS) triangulation algorithm) without considering the corresponding measurement qualities may adversely affect the accuracy of the determined position.

Another problem with the conventional integration schemes is that no approach is adopted to reduce the influence of undesirable geometric distributions. Undesirable geometric distributions refer to certain orientations of the mobile unit with respect to the various sources of the distance measurements (i.e., satellites and/or base stations) that make accurate determination of the three-dimensional or even the two-dimensional position of the mobile unit difficult. For example, accurate three-dimensional position determination may be difficult when the mobile unit and three or more of the various sources of the distance measurements all lie in approximately the same plane. Similarly, accurate two- or three-dimensional position determination may be difficult when the mobile unit and two or more of the various sources of the distance measurements all lie in approximately the same line. In these situations, a position error known as the geometric dilution of precision (GDOP) arises. When such a situation exists, it is well known that errors in the distance measurements can be greatly magnified in a conventional LMS triangulation algorithm.

As a result of these problems, an integration scheme that simply applies a conventional LMS triangulation algorithm to a combination of satellite-based distance measurements and wireless network-based distance measurements to determine the position of a mobile unit will not typically provide satisfactory results.

The present invention is directed to a technique that effectively integrates satellite-based and wireless network-based distance measurements to provide accurate position determination for mobile units of a wireless telecommunications network. Embodiments of the present invention utilize one or both of the following technologies: (1) a weighting strategy that assigns an appropriate weight to each different distance measurement (e.g., different weights for satellite-based and wireless network-based distance measurements) based on a level of confidence in the accuracy of the distance measurement, and (2) a ridge regression strategy that reduces the influence of geometric dilution of precision on the mean square error of the calculated position. The present invention can be used to increase the accuracy of position determination for mobile units, as well as to remove the requirement of having to have all distance measurements come from a single type of source (e.g., all satellite-based distance measurements or all wireless network-based distance measurements) in order to determine mobile unit position.

In one embodiment, the present invention is a method for determining the location of a terminal, comprising the steps of: (a) assigning a weight value to at least one of a set of three or more distance measurements corresponding to three or more different sources relative to the terminal to generate a weighted set of distance measurements; (b) assigning a value for an insertion parameter; and (c) performing weighted ridge regression (WRR) processing based on the weighted set of distance measurements and the insertion parameter to determine a WRR estimate representing the location of the terminal.

BRIEF DESCRIPTION OF THE DRAWINGS

Other aspects, features, and advantages of the present invention will become more fully apparent from the following detailed description, the appended claims, and the accompanying drawings in which:

FIG. 2 illustrates the processing implemented within the integrated satellite/wireless network geolocation system of FIG. 1 to determine the location of a mobile unit, according to one implementation of the present invention.

DETAILED DESCRIPTION

Figure 1:
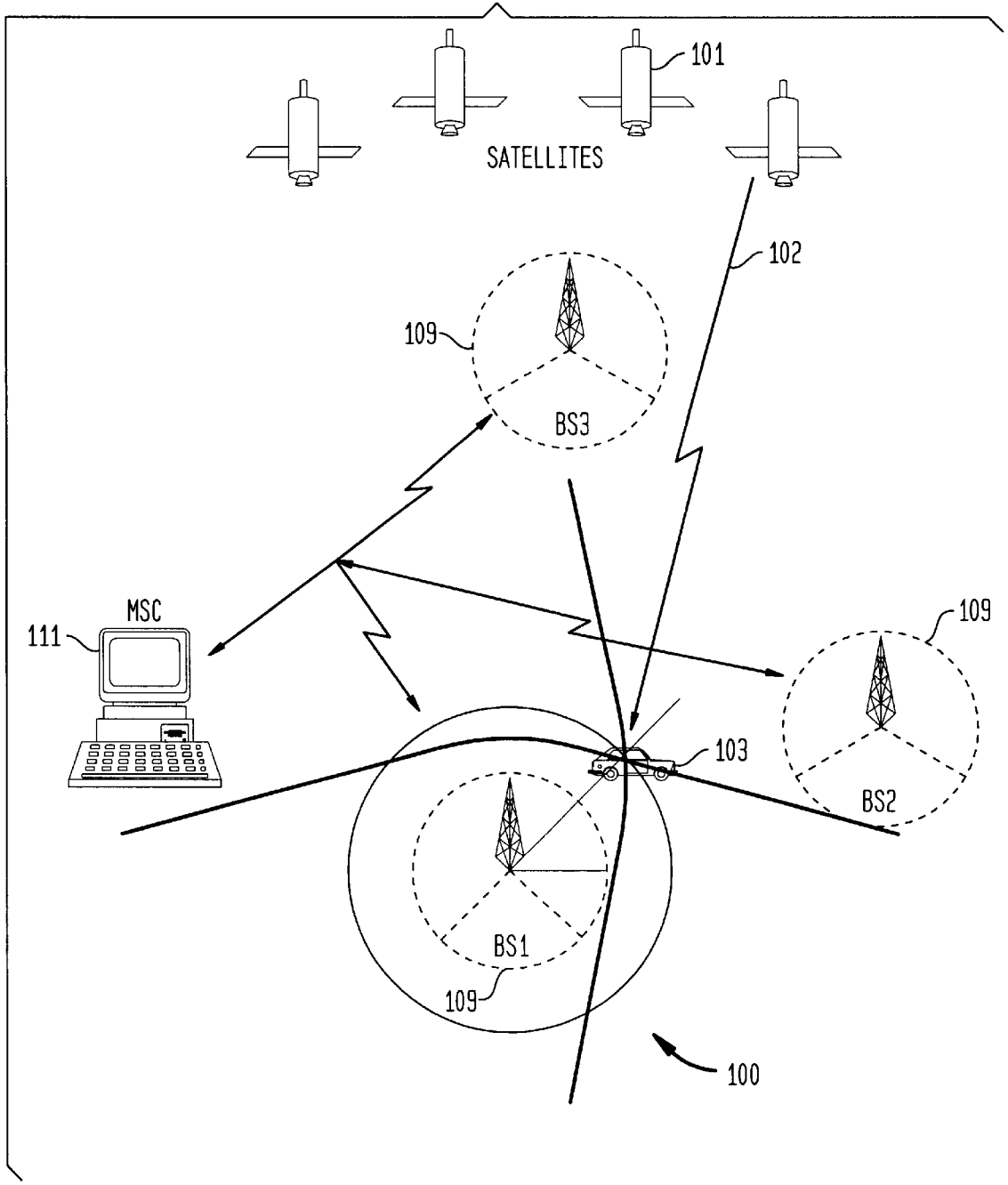
FIG. 1 represents a position determination system, according to one embodiment of the present invention.
Figure 3A:
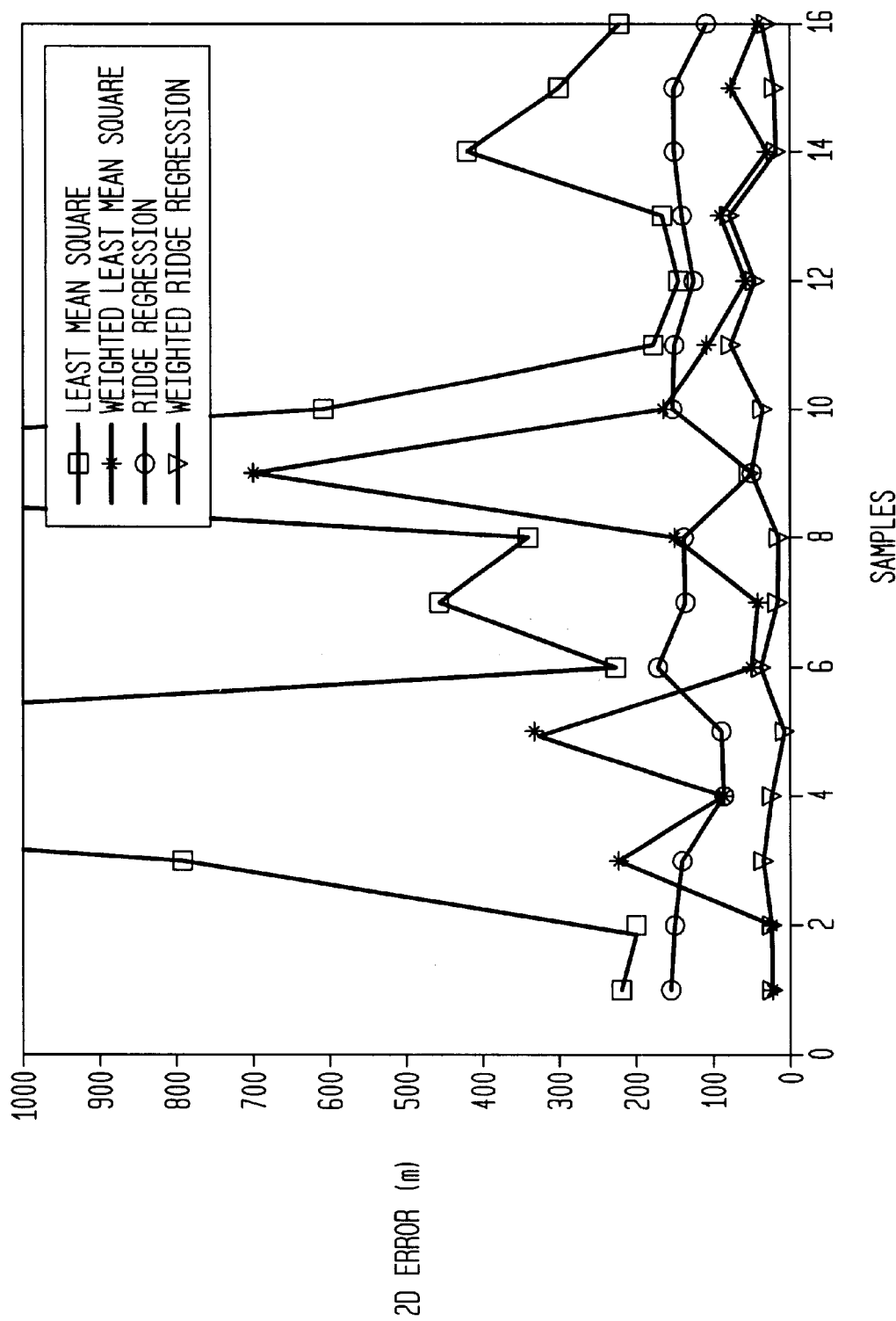
FIGS. 3A to 3E present data corresponding to computational errors resulting from different techniques for determining the location of a mobile unit based on a single wireless network-based distance measurement and different numbers of satellite-based distance measurements.
Figure 3B:
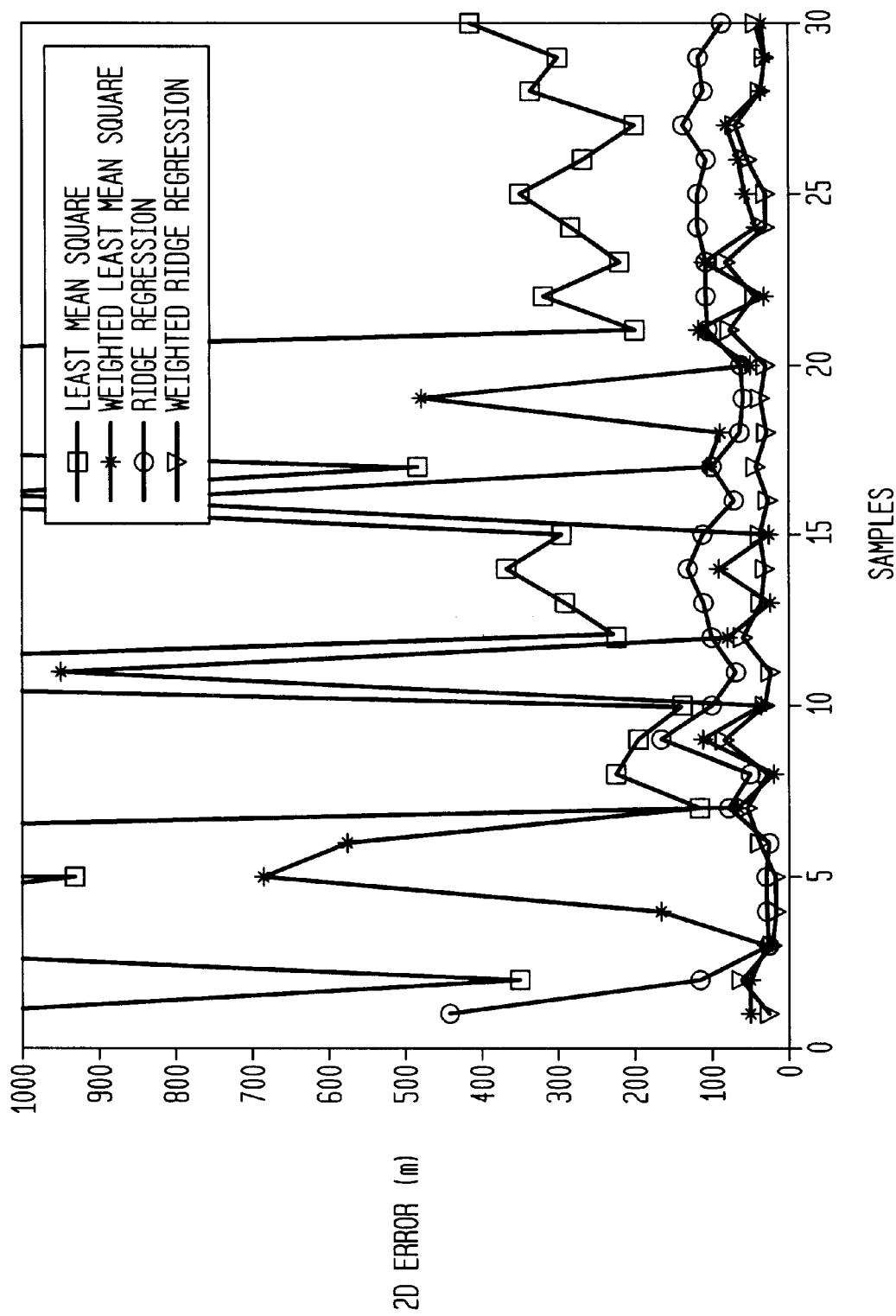
Figure 3C:
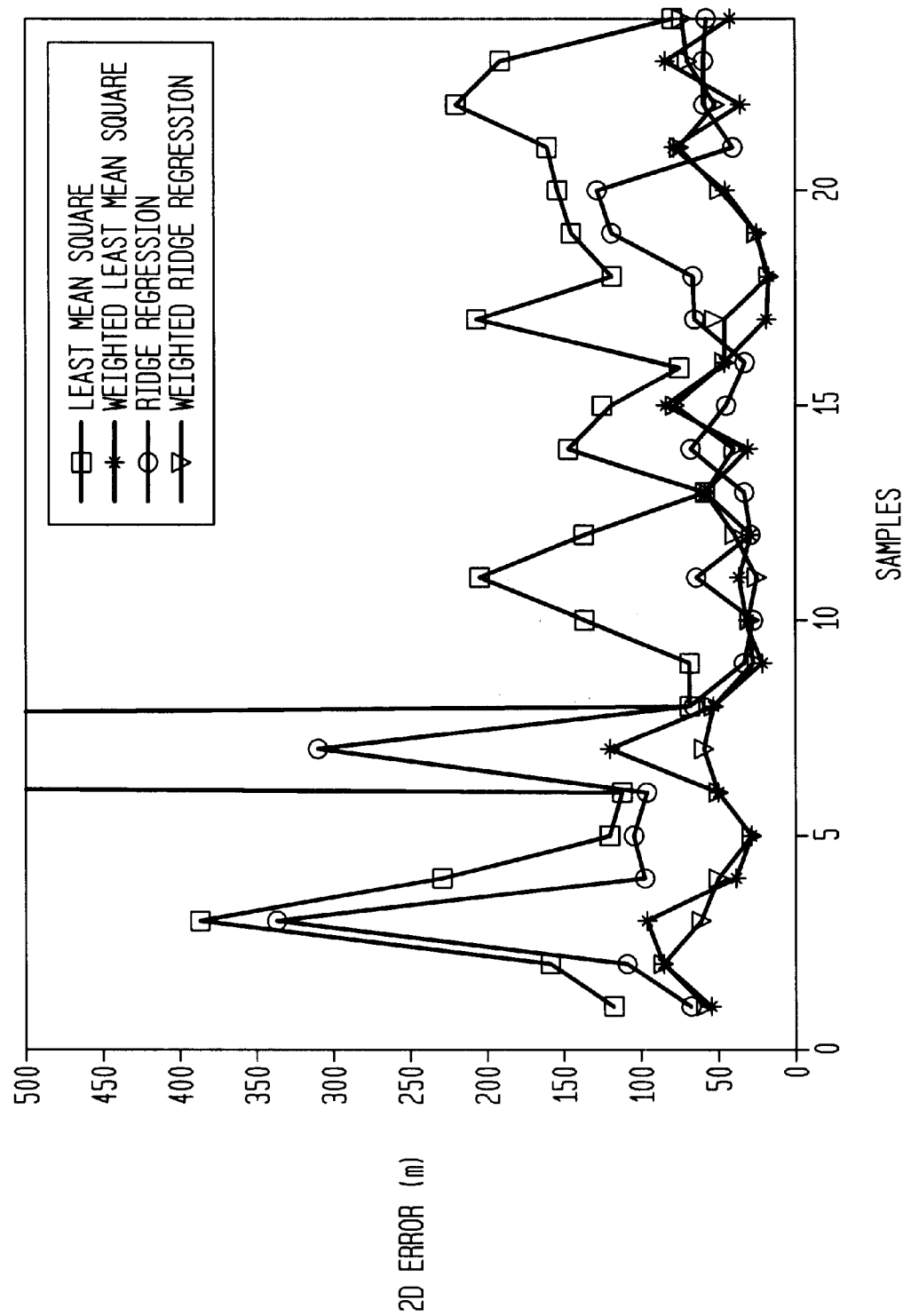
Figure 3D:
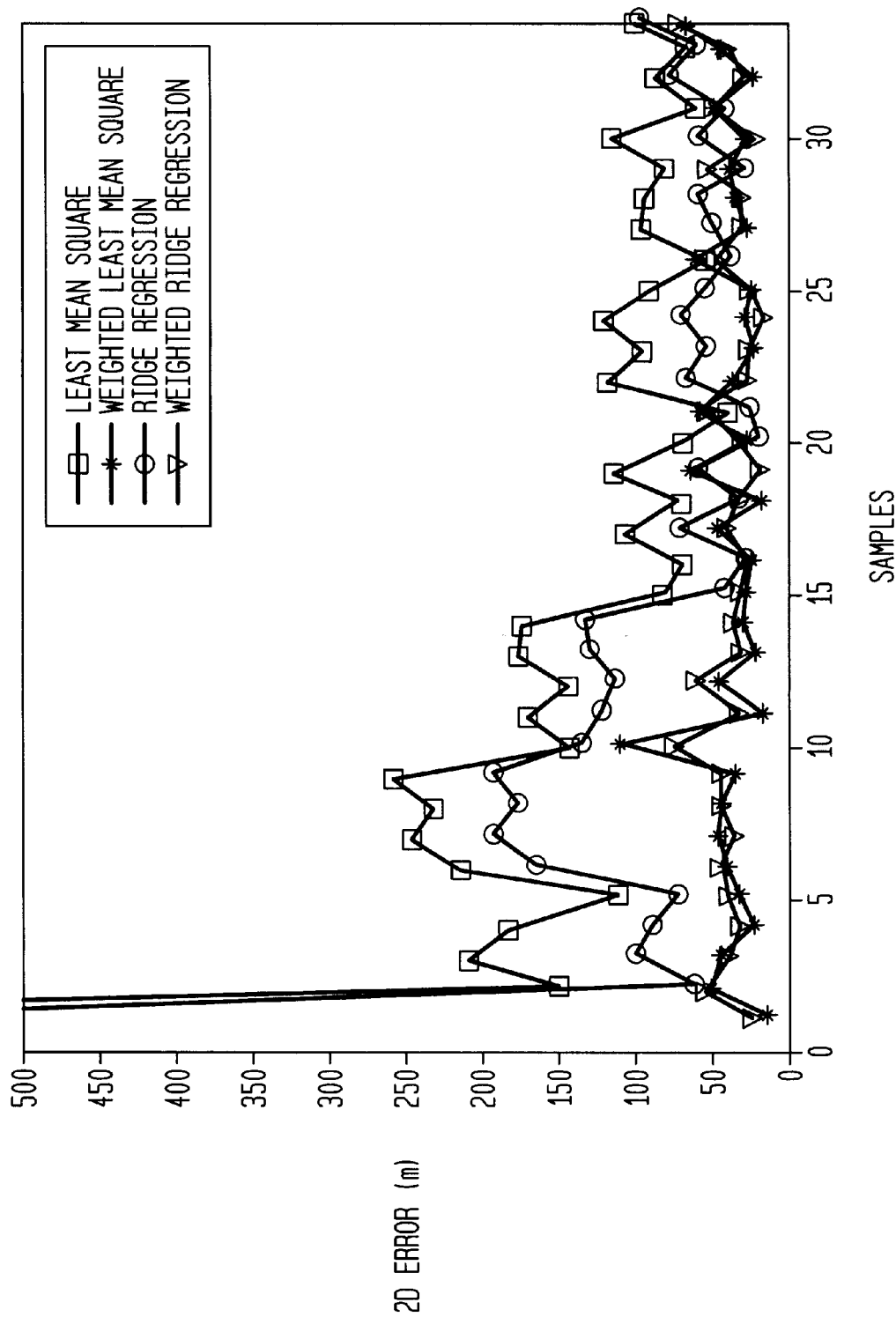
Figure 3E:
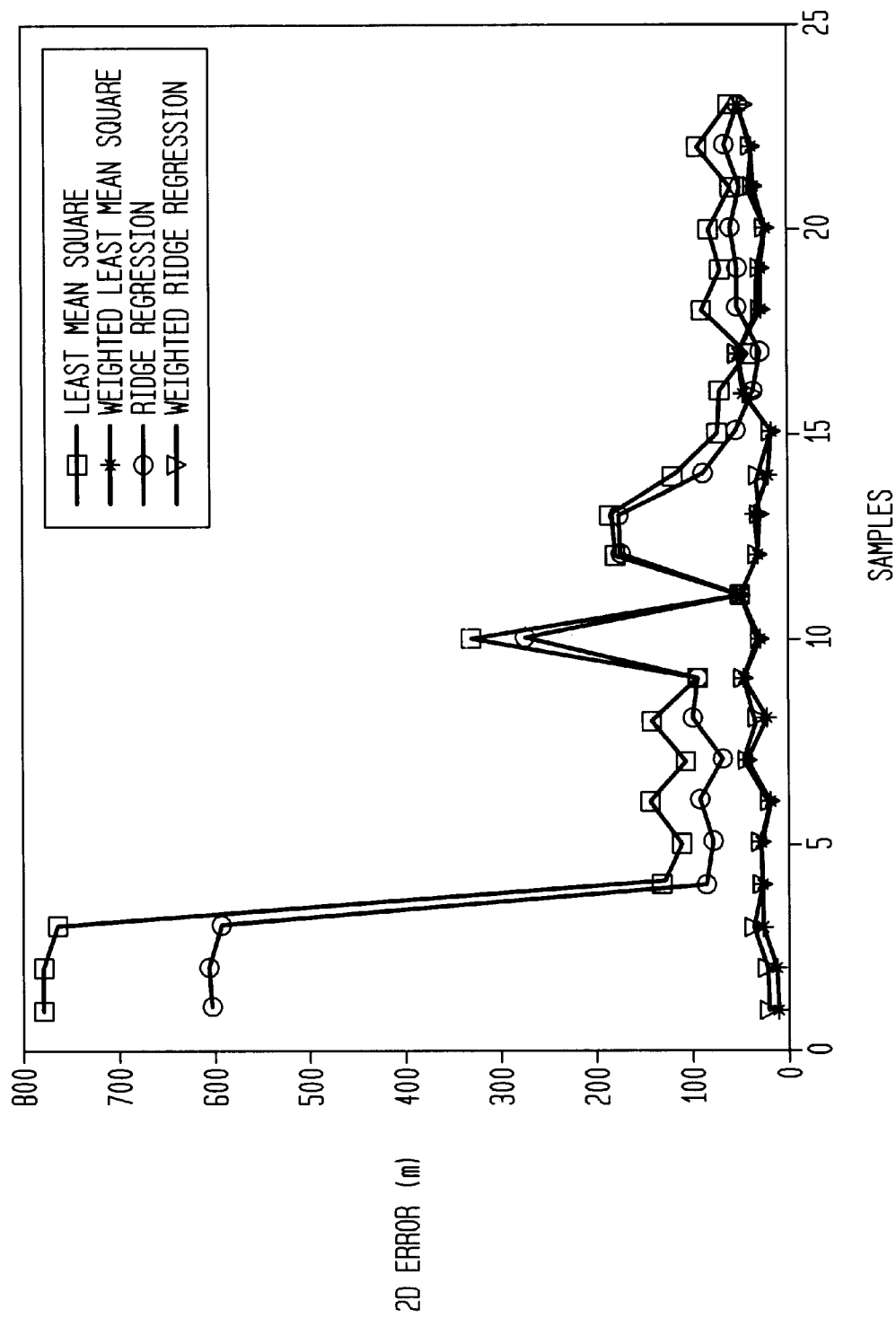

FIG. 1 represents an integrated satellite/wireless network geolocation system 100, according to one embodiment of the present invention. As shown in FIG. 1, system 100 comprises a constellation of global positioning system (GPS) satellites 101, each of which transmits a different GPS signal received by a mobile unit 103, represented in FIG. 1 as being located in an automobile. Mobile unit 103 is also part of a wireless telecommunication network comprising base stations BS1, BS2, and BS3 (109) in communication with and operating under the control of a master switching center (MSC) 111.

According to the present invention, the position of mobile unit 103 is determined based on three or more distance measurements, of which (A) one or more distance measurements are satellite-based distance measurements corresponding, for example, to GPS pseudorange measurements for one or more GPS satellites 101 and (B) one or more other distance measurements are wireless network-based distance measurements corresponding, for example, to round-trip delay or pilot phase offset measurements for one or more base stations 109. In particular, a weighted ridge regression (WRR) algorithm is applied to the set of distance measurements to determine the position of mobile unit 103. Depending on the particular implementation, the distance measurements themselves may be generated at mobile unit 103, at one or more base stations 109, and/or at MSC 111. Similarly, depending on the implementation, to determine the position of mobile unit 103, the WRR processing may be performed at mobile unit 103, at a base station 109, or at MSC 111.

In any case, ridge regression is a technique for solving a set of linear equations containing multiple unknown variables. For three-dimensional mobile unit position determination, there are four unknowns: longitude, latitude, and altitude of the mobile unit and a time bias between the local clock for the mobile unit and the GPS time for the satellites. For two-dimensional mobile unit position determination, there are three unknowns: longitude and latitude of the mobile unit and the time bias. The following section provides a basic overview of ridge regression processing as applied in three-dimensional mobile unit position determination. A ridge regression algorithm for two-dimensional mobile unit position determination is performed analogously.

Basic Ridge Regression Processing

This section provides some basic information regarding ridge regression processing for three-dimensional mobile unit position determination. Equation (1) represents a set of linear equations representing the relationship between the position of a mobile unit and the various distance measurements, as follows:

$$y=Hx+e \qquad (1)$$

where:

y is the (n×1) measurement vector, where n is the number of different distance measurements. Each element in column vector y is a distance measurement corresponding to a different source (e.g., a satellite or a base station);

H is (n×p) predictor matrix, where p is 4 for three-dimensional position determination (and 3 for two-dimensional position determination). Each row in predictor matrix H corresponds to a different distance measurement source. The first three elements in each row represent an a priori estimated unit vector pointing from the mobile unit to the corresponding source; the last element in each four-element row represents the time offset between the local time for the mobile unit and the time reference for the corresponding source. For satellite-based distance measurements where the satellite is relatively far away, the unit vector can be accurately estimated from even a very rough estimate of the location of mobile unit. For wireless network-based distance measurements, the unit vector from the mobile unit to a base station can be estimated by assuming that the mobile unit is located at the center of the corresponding base station sector. Although these estimated unit vectors may not be as accurate as those for satellite-base distance measurements, they should be accurate enough for ridge regression processing. The time offsets are typically initialized to 1. When determination of a mobile unit's position is updated with some reasonable frequency, the unit vectors and time offsets for the current position determination can be estimated using the actual mobile unit positions and time offsets from one or more previous determinations;

x is a (p×1) column vector, where the first three elements represent the (unknown) current location of the mobile unit and the last of the four elements represents the (unknown) actual time offset; and e is an (n×1) measurement error vector, where each element in column vector e represents the error in the distance measurement for a corresponding source. The error vector e is related to the (n×n) covariance matrix $R=\sigma^2 I$, where I is the (n×n) identity matrix, and $\sigma^2$ is the variance of the elements of error vector e. Note that, assuming random, uncorrelated measurement errors, the expectation value of the measurement errors, E[e], is 0.

The conventional least mean squares (LMS) solution to Equation (1) is given by Equation (2) as follows:

$$\hat{x}_{LMS}=(H^T H)^{-1} H^T y, \qquad (2)$$

where:

$\hat{x}_{LMS}$ is the calculated position of the mobile unit; and
$H^T$ is the transpose of the predictor matrix H.

The mean square error (MSE) of the LMS solution, which is a measure of the expected accuracy of the LMS position estimate $\hat{x}_{LMS}$, is given by Equation (3) as follows:

$$MSE[\hat{x}_{LMS}] = E[(\hat{x}_{LMS}-x)^T(\hat{x}_{LMS}-x)] = \sigma^2 Tr[H^T H]^{-1} = \sigma^2 \sum \frac{1}{\lambda_i} \qquad (3)$$

where:

$\lambda_i$ are the eigenvalues of $H^T H$; and
Tr is the trace operator, which is the sum of the diagonal elements of a matrix, in this case, the inverse matrix of the product of $H^T$ and H.

The geometric dilution of precision (GDOP) is defined by Equation (4) as follows:

$$GDOP = \sqrt{Tr[H^T H]^{-1}} = \sqrt{\sum \frac{1}{\lambda_i}}, \quad (4)$$

where the GDOP is the amplification factor of measurement errors into mobile unit position errors due to geometry effects. For "bad" geometries (e.g., when the mobile unit and all of the distance measurement sources lie in approximately the same plane), the smallest eigenvalues $\lambda_i$ will approach zero, resulting in a large GDOP value (as indicated by Equation (4)) and large errors in the LMS solution for mobile unit position $\hat{x}_{LMS}$ (as indicated by Equation (3)).

Ridge regression is a technique that decreases the effects of bad geometries (i.e., high GDOP) when solving Equation (1) for the unknown mobile unit position vector x. Ridge regression effectively limits the minimum values that the diagonal terms of the $H^T H$ matrix can assume by adding a small positive number k to each diagonal component. The ridge regression solution $\hat{x}_{RR}$ to Equation (1) is defined by Equation (5) as follows:

$$\hat{x}_{RR} = (H^T H + kI)^{-1} H^T y. \quad (5)$$

Because of the addition of k to the diagonal terms of the $H^T H$ matrix, the ridge regression solution $\hat{x}_{RR}$ will be biased, where the bias in $\hat{x}_{RR}$ may be expressed by Equation (6) as follows:

$$bias[\hat{x}_{RR}] = -k(H^T H + kI)^{-1} x \quad (6)$$

The mean square error of the ridge regression solution $\hat{x}_{RR}$ is given by Equation (7) as follows:

$$MSE[\hat{x}_{RR}] = k^2 x^T [H^T H + kI]^{-1} x + \sum \frac{\sigma^2 \lambda_i}{(\lambda_i + k)^2} \quad (7)$$

In Equation (7), for k>0, the first term is a monotonically increasing function of k, while the second term is a monotonically decreasing function of k. In cases having a large GDOP, a small k can be used to dramatically reduce the second term without significantly increasing the first term (as indicated by Equation (7)) and without significantly increasing the bias (as indicated by Equation (6)).

As such, a ridge regression algorithm can be effectively used to solve Equation (1) for the current position of the mobile unit, even when GDOP is large, by selecting an appropriate value for k in order to reduce the magnitude of the expected errors and without introducing a significant amount of bias. The value for k used in the ridge regression processing can be selected in different ways. It can be selected based on a determination of the value of GDOP using Equation (4), where a relatively large GDOP value implies the need for relatively large k value. Alternatively, different values for k can be tried until the error represented by Equation (7) is minimized. In any case, typical values for k will lie between 0 and 1, with k=0 corresponding to the conventional LMS solution of Equation (2).

Weighted Ridge Regression Processing

As described earlier, for an integrated satellite/wireless network geolocation system, the accuracy of different types of distance measurements (e.g., GPS pseudorange measurements vs. wireless network RTD/PPO measurements) are typically quite different. It is also possible that the accuracy of distance measurements of the same type from different sources (e.g., different satellites or different base stations) may also vary from source to source. According to certain implementations of the present invention, in order to enhance the accuracy of the mobile unit position estimate derived during ridge regression processing, a weighting scheme is combined with the ridge regression algorithm. The resulting weighted ridge regression (WRR) algorithm is implemented by assigning appropriate weights to each of the distance measurements used during ridge regression processing to estimate the current position of the mobile unit, as represented by $\hat{x}_{WRR}$ in Equation (8) as follows:

$$\hat{x}_{WRR} = (H^T W H + kI)^{-1} H^T W y \quad (8)$$

where W is an (n×n) weighting matrix in which each element has a positive value. The purpose of including the weighting matrix W is to give each measurement component a (possibly) different weight based on its corresponding uncertainty (i.e., related to the corresponding level of confidence in its accuracy). Larger weight values are assigned to more accurate distance measurements, where the relative accuracy of a distance measurement corresponding to a particular source may be determined from such parameters as signal power at the mobile unit, elevation angle, and/or past experience.

As with the ridge regression estimate $\hat{x}_{RR}$, the weighted ridge regression estimate $\hat{x}_{WRR}$ will be biased based on the use of a non-zero value for k. The WRR bias is represented by Equation (9) as follows:

$$\begin{aligned}
bias[\hat{x}_{WRR}] &= E[\hat{x}_{WRR} - x] \quad (9) \\
&= E[(H^T W H + kI)^{-1} H^T W y - x] \\
&= (H^T W H + kI)^{-1} E[H^T W y - (H^T W H + kI)x] \\
&= (H^T W H + kI)^{-1} E[H^T W (Hx + e) - (H^T W H + kI)x] \\
&\quad (H^T W H + kI)x] \\
&= k(H^T W H + kI)^{-1} x
\end{aligned}$$

The mean square error of the weighted ridge regression estimate is then given by Equation (10) as follows:

$$\begin{aligned}
MSE[\hat{x}_{WRR}] &= E[(\hat{x}_{WRR} - x)^T (\hat{x}_{WRR} - x)] \quad (10) \\
&= E\{[(H^T W H + kI)^{-1}(H^T W e + kx)]^T [(H^T W H + kI)^{-1}(H^T W e + kx)]\} \\
&= Tr[(H^T W H + kI)^{-1} H^T W R W H (H^T W H + kI)^{-1}] + \\
&\quad k^2 x^T [H^T W H + kI]^{-2} x
\end{aligned}$$

Equation (10) includes two parameters: the weighting matrix W and the ridge regression parameter k. For k>0, the first term in Equation (10) is a monotonically decreasing function of k, while the second term is a monotonically increasing function of k. As with the ridge regression algorithm, a properly selected value for k (typically between 0 and 1) in the weighted ridge regression algorithm can be used to reduce the mean square error in the WRR position estimate $\hat{x}_{WRR}$ (as indicated by Equation (10)) without significantly increasing the bias in that estimate (as indicated by Equation (9)), thereby significantly improving the accuracy of the WRR position estimate $\hat{x}_{WRR}$ (compared to the LMS and even the "unweighted" ridge regression estimates), especially for situations of bad geometry (as indicated by the value of GDOP according to Equation (4)). The weighting matrix W, which enables different weights to be given to different distance measurements, will also affect the MSE of the WRR estimate. By properly choosing the values of the different weights in W, the performance of an integrated satellite/wireless network geolocation system can be significantly improved.

Integrated Processing Algorithms

FIG. 2 illustrates the processing implemented within integrated satellite/wireless network geolocation system 100 of FIG. 1 to determine the location of mobile unit 103, according to one implementation of the present invention. According to this implementation, depending on the particular geometries involved (as indicated by the value of GDOP from Equation (4)), either a least mean square (LMS) algorithm or a weighted ridge regression (WRR) algorithm is applied to each set of satellite-based and/or wireless network-based distance measurements in order to estimate the location of wireless unit 103.

In particular, the various satellite-based and/or wireless network-based distance measurements are generated for mobile unit 103 (step 202 of FIG. 2). A predictor matrix H is constructed based on the known positions of the satellites and base stations that were the sources of those distance measurements and an a priori approximate location of mobile unit 103 (step 204). The geometric dilution of precision (GDOP) for that geometry is then calculated, for example, using Equation (4) (step 206). If the GDOP is smaller than a specified threshold (indicating that a good geometry exists) (step 208), then the position of mobile unit 103 may be accurately determined using a conventional least mean square algorithm (steps 210 to 212), which is typically less computationally intense than a weighted ridge regression algorithm of the present invention. Otherwise, a bad geometry exists and the position of mobile unit 103 is determined using a weighted ridge regression algorithm of the present invention (steps 214 to 218), in order to reduce the errors that might otherwise result from a conventional LMS technique.

For the LMS algorithm, since the GDOP is sufficiently large, no insertion parameter k is needed (step 210), and conventional processing is applied to determine the LMS mobile unit position estimate $\hat{x}_{LMS}$, for example, using Equation (2) to calculate the current position of mobile unit 103 (step 212).

For the WRR algorithm, since the GDOP is relatively small, in order to avoid corresponding computational errors, the insertion parameter k is set to an appropriate positive value (step 214). The value of k may be determined by simulation based on the assertion that the value of k should result in the lowest mean square error (MSE) given, for example, by Equation (10).

Appropriate weights are then assigned for the various distance measurements for the weighting matrix W (step 216) in order to determine the weighted ridge regression estimated $\hat{x}_{WRR}$, for example, using Equation (8) to calculate the position of mobile unit 103 (step 218). The elements in the weighting matrix W may be selected based on prior knowledge, e.g., the known statistical properties of the measurement errors and other predetermined parameters. Lower weights are assigned to those distance measurements having relatively large error values (e.g., the RTD/PPO-based measurements), while higher weights are assigned to those distance measurements having relatively small error values (e.g., GPS pseudorange measurements). The WRR estimate $\hat{x}_{WRR}$ is typically a better estimate when compared to conventional estimates (e.g., $\hat{x}_{LMS}$ generated using Equation (2)), because weighted ridge regression has been used to compute this estimate and the errors have been reduced to a minimum by choosing appropriate weights for W and using a positive insertion value k.

In an alternative implementation of the present invention, the weighted ridge regression processing with a positive value for insertion parameter k of steps 214–218 is used for every calculation of mobile unit position, independent of the magnitude of GDOP. In that case, steps 208–212 may be omitted from the processing shown in FIG. 2.

FIGS. 3A to 3E present data corresponding to computational errors resulting from different techniques for determining the location of a mobile unit based on a single wireless network-based distance measurement and different numbers of satellite-based distance measurements. The different techniques include a least mean square technique without weighting, a weighted LMS technique, a ridge regression technique without weighting, and a weighted ridge regression technique. The number of satellite-based distance measures ranges from two in FIG. 3A to six in FIG. 3E. The single wireless network-based distance measure is based on an RTD measurement, while the satellite-based distance measurements are based on GPS pseudorange measurements.

As shown in FIGS. 3A–E, two-dimensional computational errors remain below 100 meters for the WRR technique of the present invention, even when only two satellite-based distance measurements are available. Compare these results to the computational errors involved with the conventional LMS technique, which often exceed 100 meters, even when as many as six satellite-based distance measurements are used.

Even though the results shown in FIGS. 3A–E are based on only a single wireless network-based distance measurement, the present invention may be implemented for any combination of three or more distance measurements from any combination of sources. For example, one satellite-based distance measurement may be combined with two or more wireless network-based distance measurements for mobile unit position determination.

The present invention has been described in the context of integrating distance measurements from a satellite navigation system and a wireless network to determine the position of a mobile unit. In general, the present invention can be applied to integrate distance measurements from two or more different types of sources, whether those sources are satellites or base stations or any other suitable distance measurement source. Moreover, the present invention can be applied to increase position determination accuracy when all of the distance measurements come from a single type of source, whether those sources are all satellites in a satellite navigation system or all base stations in a wireless network or any other suitable source of distance measurements.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for determining location of a terminal, comprising the steps of:
   (a) assigning a weight value to at least one of a set of three or more distance measurements corresponding to three or more different sources relative to the terminal to generate a weighted set of distance measurements, wherein:
   the terminal is a mobile unit in a wireless network;
   at least one of the distance measurements is a wireless network-based distance measurement;
   at least one of the distance measurements is a satellite-based distance measurement; and
   the at least one wireless network-based distance measurement and the at least one satellite-based distance measurement are assigned different weight values;
   (b) assigning a value for an insertion parameter; and
   (c) performing weighted ridge regression (WRR) processing based on the weighted set of distance measurements and the insertion parameter to determine a WRR estimate representing the location of the terminal.

2. The invention of claim 1, wherein the at least one wireless network-based distance measurement is a round-trip delay (RTD) distance measurement.

3. The invention of claim 1, wherein the at least one wireless network-based distance measurement is a pilot phase offset (PPO) distance measurement.

4. The invention of claim 1, wherein the at least one satellite-based distance measurement is a GPS pseudorange measurement.

5. The invention of claim 1, wherein step (c) comprises the step of evaluating the following equation:

$$\hat{x}_{WRR}=(H^TWH+kI)^{-1}H^TWy$$

wherein:
$\hat{x}_{WRR}$ is the WRR estimate;
H is a predictor matrix based on locations of the sources of the distance measurements;
$H^T$ is a transpose of the predictor matrix H;
W is a weighting matrix based on the one or more assigned weight values;
k is the insertion parameter;
I is an identity matrix; and
y is a measurement vector based on the distance measurements.

6. The invention of claim 1, wherein step (b) comprises the steps of:
   (1) computing a geometric dilution of precision (GDOP) value based on locations of the sources of the distance measurements; and
   (2) setting the value for the insertion parameter based the GDOP value.

7. The invention of claim 6, wherein the GDOP value is calculated using the following equation:

$$GDOP=\sqrt{Tr[H^TH]^{-1}}$$

wherein:
Tr is a trace operator;
H is a predictor matrix based on the locations of the sources of the distance measurements; and
$H^T$ is a transpose of the predictor matrix H.

8. The invention of claim 6, wherein step (c) comprises the steps of
   (a) performing a least mean square algorithm to calculate the location of the terminal, if the GDOP value is less than a specified threshold; and
   (b) performing the WRR processing, if the GDOP value is not less than the specified threshold.

9. The invention of claim 1, wherein a weight value is assigned to each distance measurement.

10. The invention of claim 1, wherein:
   step (b) comprises the steps of:
   (1) computing a geometric dilution of precision (GDOP) value based on locations of the sources of the distance measurements using the following equation:

$$GDOP=\sqrt{Tr[H^TH]^{-1}}$$

wherein:
   Tr is a trace operator;
   H is a predictor matrix based on the locations of the sources of the distance measurements; and
   $H^T$ is a transpose of the predictor matrix H; and
   (2) setting the value for the insertion parameter based the GDOP value; and
   step (c) comprises the step of evaluating the following equation:

$$\hat{x}_{WRR}=(H^TWH+kI)^{-1}H^TWy$$

wherein:
   $\hat{x}_{WRR}$ is the WRR estimate;
   W is a weighting matrix based on the one or more assigned weights;
   k is the insertion parameter;
   I is an identity matrix; and
   y is a measurement vector based on the distance measurements.

11. The invention of claim 10, wherein step (c) comprises the steps of
   (a) performing a least mean square algorithm to calculate the location of the terminal, if the GDOP value is less than a specified threshold; and
   (b) performing the WRR processing, if the GDOP value is not less than the specified threshold.

12. A machine-readable medium, having encoded thereon program code, wherein, when the program code is executed by a machine, the machine implements a method for determining location of a terminal, comprising the steps of:
   (a) assigning a weight to at least one of a set of three or more distance measurements corresponding to three or more different sources relative to the terminal to generate a weighted set of distance measurements, wherein:
   the terminal is a mobile unit in a wireless network;

at least one of the distance measurements is a wireless network-based distance measurement;

at least one of the distance measurements is a satellite-based distance measurement; and the at least one wireless network-based distance measurement and the at least one satellite-based distance measurement are assigned different weight values;

(b) assigning a value for an insertion parameter; and (c) performing weighted ridge regression (WRR) processing based on the weighted set of distance measurements and the insertion parameter to determine a WRR estimate representing the location of the terminal.

13. The invention of claim 12, wherein:

the at least one wireless network-based distance measurement is a round-trip delay (RTD) distance measurement or a pilot phase offset (PPO) distance measurement; and the at least one satellite-based distance measurement is a GPS pseudorange measurement.

14. The invention of claim 12, wherein step (c) comprises the step of evaluating the following equation:

$$\hat{x}_{WRR}=(H^TWH+kI)^{-1}H^TWy$$

wherein:

$x_{WRR}$ is the WRR estimate;

H is a predictor matrix based on locations of the sources of the distance measurements;

$H^T$ is a transpose of the predictor matrix H;

W is a weighting matrix based on the one or more assigned weight values;

k is the insertion parameter;

I is an identity matrix; and y is a measurement vector based on the distance measurements.

15. The invention of claim 12, wherein step (b) comprises the steps of:

(1) computing a geometric dilution of precision (GDOP) value based on locations of the sources of the distance measurements; and (2) setting the value for the insertion parameter based the GDOP value.

16. The invention of claim 15, wherein the GDOP value is calculated using the following equation:

$$GDOP=\sqrt{Tr[H^{TH}]^{-1}}$$

wherein:

Tr is a trace operator;

H is a predictor matrix based on the locations of the sources of the distance measurements; and $H^T$ is a transpose of the predictor matrix H.

17. The invention of claim 15, wherein step (c) comprises the steps of (a) performing a least mean square algorithm to calculate the location of the terminal, if the GDOP value is less than a specified threshold; and (b) performing the WRR processing, if the GDOP value is not less than the specified threshold.

18. The invention of claim 12, wherein a weight value is assigned to each distance measurement.

19. The invention of claim 12, wherein:

step (b) comprises the steps of:

(1) computing a geometric dilution of precision (GDOP) value based on locations of the sources of the distance measurements using the following equation:

$$GDOP=\sqrt{Tr[H^{TH}]^{-1}}$$

wherein:

Tr is a trace operator;

H is a predictor matrix based on the locations of the sources of the distance measurements; and $H^T$ is a transpose of the predictor matrix H; and (2) setting the value for the insertion parameter based the GDOP value; and step (c) comprises the step of evaluating the following equation:

$$\hat{x}_{WRR}=(H^TWH+kI)^{-1}H^TWy$$

wherein:

$x_{WRR}$ is the WRR estimate;

W is a weighting matrix based on the one or more assigned weights;

k is the insertion parameter;

I is an identity matrix; and y is a measurement vector based on the distance measurements.

20. The invention of claim 19, wherein step (c) comprises the steps of (a) performing a least mean square algorithm to calculate the location of the terminal, if the GDOP value is less than a specified threshold; and (b) performing the WRR processing, if the GDOP value is not less than the specified threshold.

* * * * *

UNITED STATES PATENT AND TRADEMARK OFFICE
CERTIFICATE OF CORRECTION

PATENT NO. : 6,587,692 B1  Page 1 of 1
DATED : July 1, 2003
INVENTOR(S) : Byron H. Chen, Ren Da, and Ibrahim Tekin It is certified that error appears in the above-identified patent and that said Letters Patent is hereby corrected as shown below:

Column 10,
Lines 6 and 29, replace "$[H^{TH}]$" in the formula with -- $[H^{T}H]$ --.

Column 11,
Line 43, replace "based the" with -- based on the --.
Line 47, replace "$[H^{TH}]$" in the formula with -- $[H^{T}H]$ --.

Column 12,
Line 20, replace "$[H^{TH}]$" in the formula with -- $[H^{T}H]$ --.

Signed and Sealed this

Thirtieth Day of September, 2003

JAMES E. ROGAN
*Director of the United States Patent and Trademark Office*